Patented Nov. 21, 1939

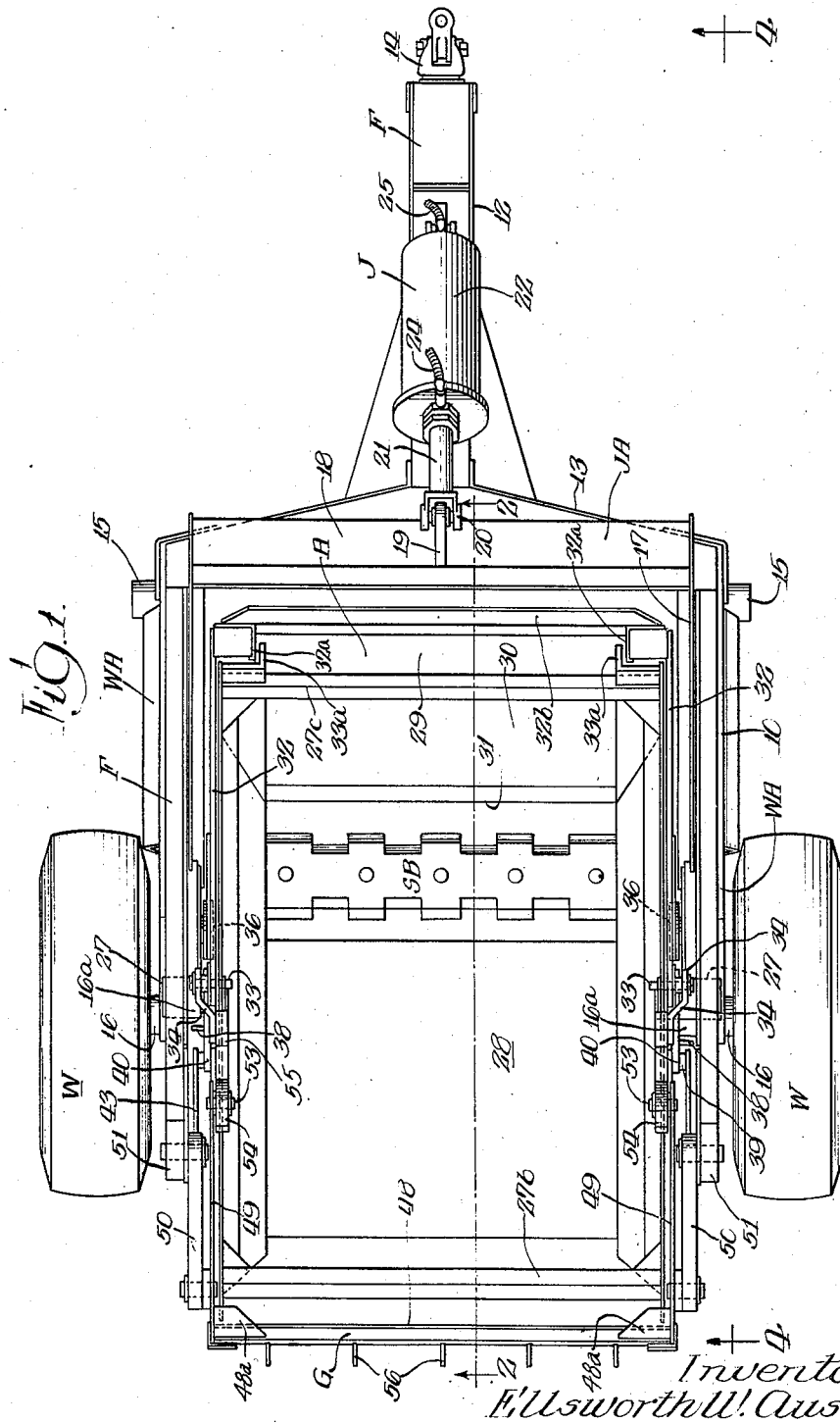

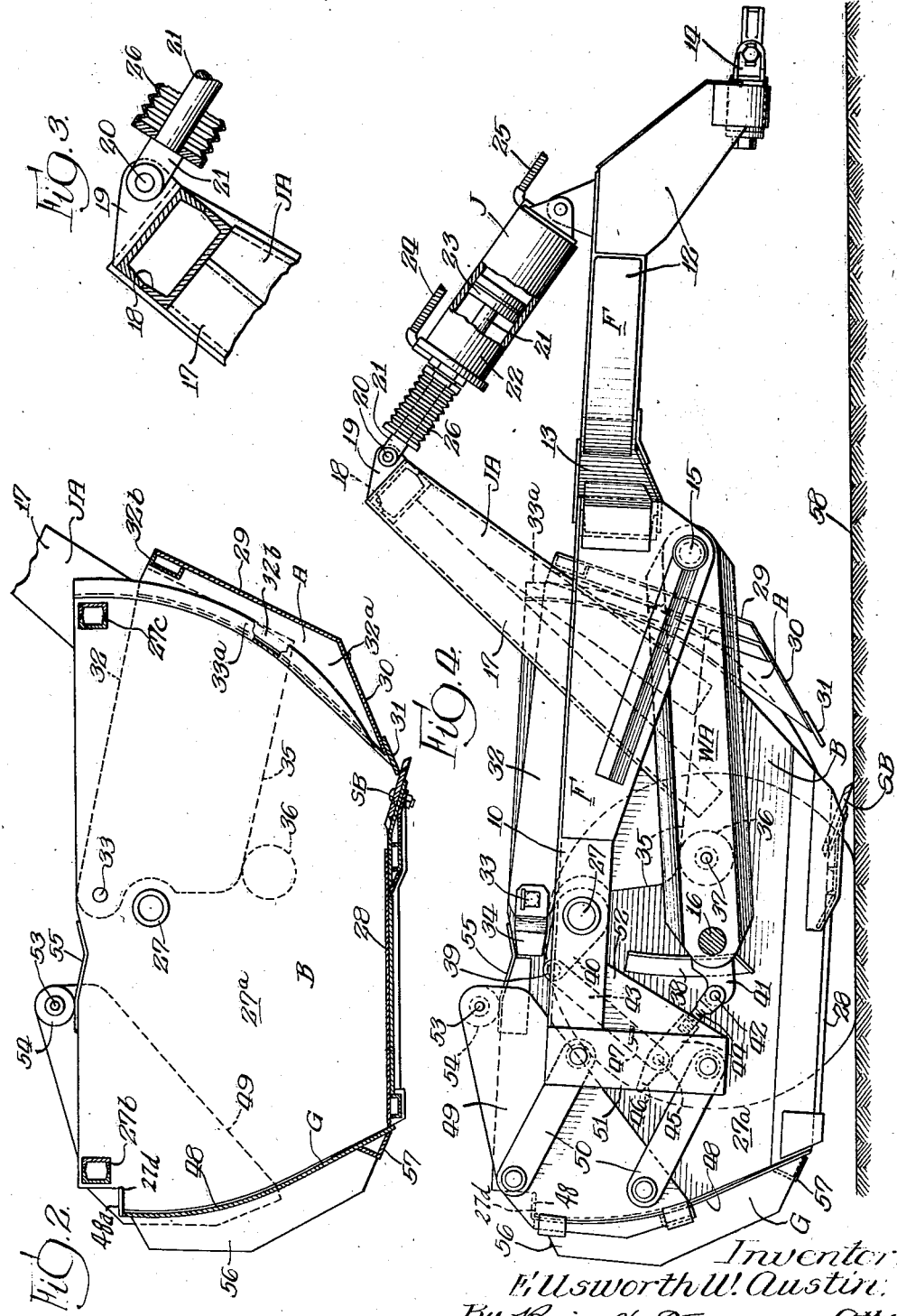

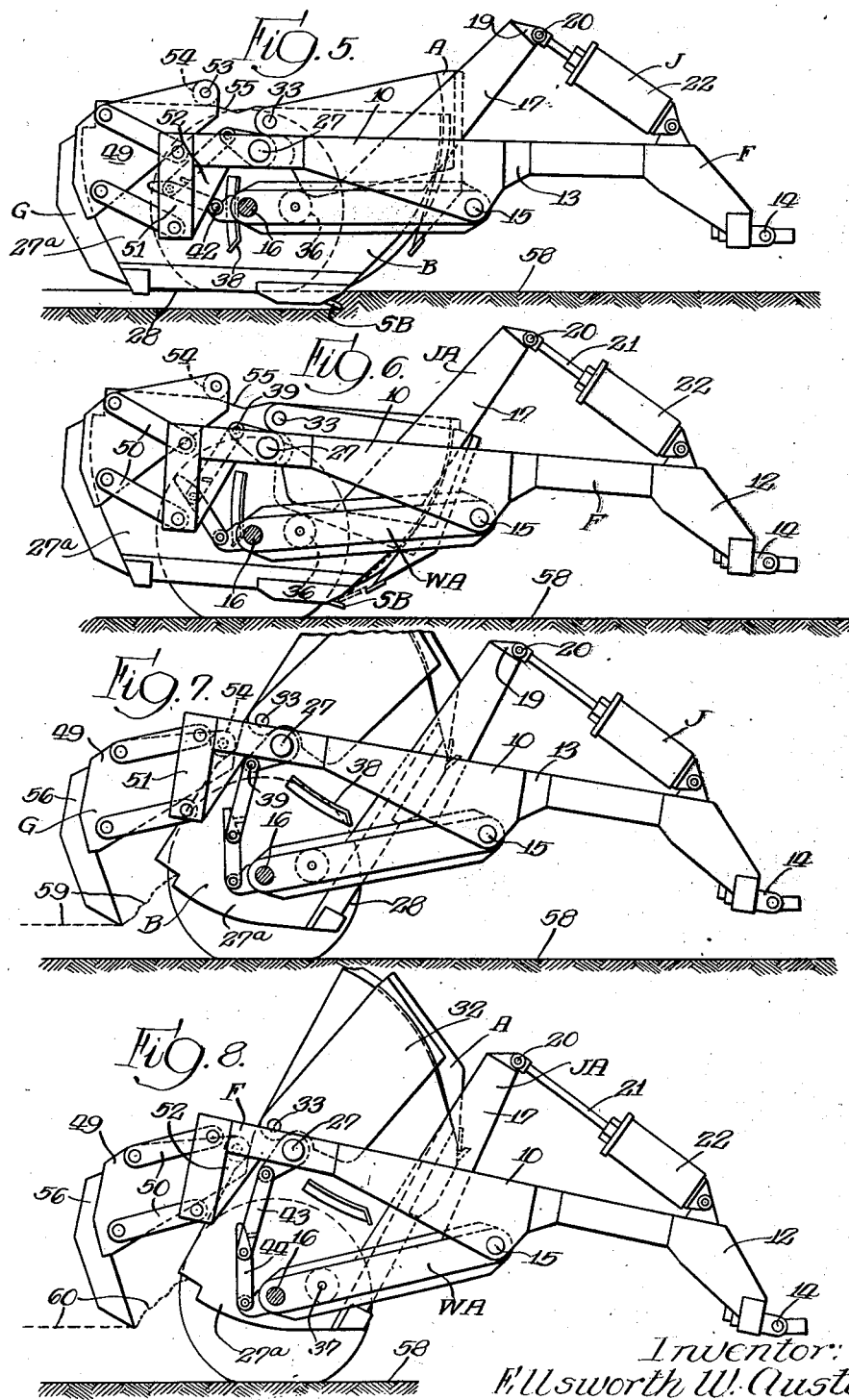

2,180,658

UNITED STATES PATENT OFFICE 2,180,658

EARTH MOVING DEVICE

Ellsworth W. Austin, Cedar Rapids, Iowa, assignor to La Plant-Choate Manufacturing Co. Inc., Cedar Rapids, Iowa, a corporation of Delaware Application January 26, 1938, Serial No. 187,020

21 Claims. (Cl. 37—133)

An object of my invention is to provide an earth moving device particularly adapted for both earth scraping and carrying operations, the mechanism of my device being comparatively simple and inexpensive to manufacture and involving the necessity of using but a single hydraulic jack for adjusting the bowl for dumping operations as well as for scraping and carrying operations.

A further object is to provide a bowl having sides, a bottom, a front apron and a rear gate movable relative to the bowl, both the apron and the gate being so associated with the frame of the device and with the bowl that when the bowl is in digging position, the apron is automatically raised to open the front of the bowl and when the bowl is in dumping position, it automatically moves away from the gate, which leaves the rear end of the bowl open for the dumping operation, all of these adjustments being effected by the single hydraulic jack in different positions of adjustment thereof.

Another object is to provide a bowl for earth scraping operations and for each carrying and dumping operations, the bowl having a movable apron at the front which is provided with cams coacting with wheel arms of the device, and the parts being so arranged that the cams effect opening of the apron when the bowl is adjusted to digging positions.

Still another object is to provide a rear gate for the bowl so supported by the frame of the device that the bowl moves away from the gate when in dumping position and so coacts with the gate through a cam connection whereby the bowl, at different dumping angles, adjusts the gate to various heights relative to the ground surface for utilizing the gate for earth spreading operations and making it possible to adjust the gate to secure different desired depths of spread.

Another object is to provide an earth moving device including a frame and wheel arms, wheels being provided for supporting the wheel arms and thereby the frame, the wheel arms being pivoted to the frame and a hydraulic jack being utilized as a means to adjust the wheel arms relative to the frame, such adjustment in conjunction with other details of construction and association of the parts of the earth moving device, making it possible to secure opening of a front apron during digging operations, closing of this apron during carrying operations and dumping operations and movement of the bowl away from the rear gate during the dumping operation.

A further object is to associate the gate at the rear of the bowl with the bowl in such manner that different angular positions of the bowl during the dumping operation may be effected by the jack and in turn effect different height adjustments for the gate.

Another object is to provide a lost motion connection between the wheel arms and the bowl which, during earth digging and carrying operations, permits the bowl to remain in a predetermined position relative to the frame of the machine but effects tipping of the bowl to a dumping position when the frame and bowl are elevated above earth carrying position.

With these and other objects in view, my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a plan view of an earth moving device embodying my present invention.

Figure 2 is a sectional view on the line 2—2 of Figure 1 showing the bowl in position with its scraper blade just touching the ground surface.

Figure 3 is a sectional view of the jack arm of my earth moving device, and is a continuation of the upper forward end of Figure 2 on a larger scale.

Figure 4 is a side elevation of my earth moving device in the same position as illustrated in Figure 2.

Figure 5 is a diagrammatic view of my earth moving device showing it in scraping and digging position.

Figure 6 is a similar diagrammatic view showing my device in earth carrying position; and Figures 7 and 8 are similar diagrammatic views showing the device in earth dumping and spreading positions, the depth of spread in Figure 8 being deeper than that in Figure 7.

On the accompanying drawings I have used the reference character F to indicate generally a frame. The frame F comprises a pair of side arms 10, a tongue 12 and a cross member 13 for connecting the rear end of the tongue 12 rigidly to the forward ends of the side arms 10. At the forward end of the tongue 12 a coupling member 14 is provided which may be connected to any draught device, such as a "Caterpillar" tractor. The side arms 10 of the frame F are provided with a pair of pivots 15 on which are pivoted wheel arms WA. The wheel arms WA carry stationary stub shafts 16 on which are journalled wheels W. The wheels W are preferably of the large pneumatic truck type and when loaded become somewhat flattened along the lower part, which has been illustrated on the drawings.

The wheel arms WA are held fixed relative to the frame F by a jack arm JA and a hydraulic jack J. The arms JA are inverted U-shaped having side portions 17 and a cross bar portion 18. The parts thus far described are made up of channel sections, angles, and flat plates welded together as illustrated on the drawings, although their detailed construction forms no part of my present invention.

The cross member 18 has at its center an ear 19. The ear 19 carries a pivot pin 20 to which the piston rod 21 of the jack J is pivoted. The piston rod extends into a cylinder 22 of the jack and has thereon the usual piston 23. The piston is adapted to be moved either into or out of the cylinder 22 to the desired position in the usual manner by pumping oil either to a flexible tube connection 24 and from a similar connection 25, or vice-versa. When the pumping operation is stopped the piston 23 is thereby hydraulically located in the position to which it has been moved.

A flexible bellows 26 is preferably provided for preventing dirt getting in to the piston rod 21 and this bellows has been omitted from Figure 1 and from the diagrammatic figures.

The frame F includes a pivot 27 for a bowl B, the bowl B having sides 27a reinforced by cross members 27b and 27c. The bowl B also has a bottom 28. On the forward edge of the bottom a scraper blade SB is mounted. This blade has opposite notched cutting edges as shown and described in my copending application filed July 10, 1937, Serial #152,898. The front and rear of the bowl B are open as far as the construction of the bowl itself is concerned, but are normally closed by a front apron A and a rear gate G as will hereinafter appear.

The bowl B being pivoted on the shafts 27 is adapted to tip rearwardly from the positions shown in Figures 2 and 4 for dumping purposes. The bowl B normally maintains a position relative to the frame F as illustrated in these two figures.

The front apron A includes a closure plate 29 at the front end having at the lower forward corner of the bowl an angularly directed portion 30. This portion terminates in a replaceable bumper plate 31 which, as shown in Figure 6 by dotted lines, normally engages the top of the scraper blade SB.

The closure plate 29 is mounted relative to the bowl B by means of side plates 32 which are pivoted to pivot pins 33. The pins 33 are carried by the sides 27a of the bowl B and are reinforced by plates 34 so that a double bearing on the bowl is provided for the pivot 33. In addition to the side plates 32, the apron A has a pair of narrow side plate portions 32a reinforced by a cross bar 32b. These portions are adapted to overlap angle members 33a which are secured to the sides 27a of the bowl to form an effective closure with the bowl during the earth carrying operation with a minimization of the possibility of earth clogging the space between the forward edges of the bowl and the apron A such as to prevent closure of the apron.

The side plates 32 of the apron A are provided with cam surfaces 35 adapted to coact with rollers 36. Each wheel arm WA is provided with a stub shaft 37 on which one of the rollers 36 is journalled.

The bowl sides are provided with dump-prevention cams 38 which are formed of angle irons secured to the sides 27 of the bowl. The cams 38 are adapted to coact with inwardly extended ends 16a of the stub shafts 16. The bowl sides 27 are provided with link pivot pins 39 which are reinforced by plate-like arms 40 so as to provide double bearings for the pivot pins 39. The wheel arms WA are provided with extensions 41 carrying pivot pins 42.

The pivot pins 39 and 42 are connected by lost motion or toggle link connections on each side of the bowl and each comprising an upper link 43 and lower link 44. The links 43 and 44 are pivoted together at 45. They are provided with stop lugs 46 and 47 adapted to coact with each other at certain times as will hereinafter appear. The link 44 is of turnbuckle character to provide adjustment for the relative positions of the parts.

The rear gate G comprises a closure plate 48 for the rear of the bowl B and side plates 49. Each side plate 49 is connected by parallelogram links 50 to an extension 51 of the frame F. The extensions 51 are reinforced by gusset plates 52.

The side plates 49 carry stub shafts 53 on which are mounted rollers 54. The rollers 54 are adapted to coact with tracks 55 on the upper edges of the bowl sides 27. The closure plate 48 is reinforced by flanges 56 and an angle bar 57.

*Practical operation*

In the operation of my earth moving device, assuming the parts to be in the positions of Figures 2 and 4, it will be noted that the front apron A is slightly open and that the bowl is in such position that the scraper blade SB is just touching the ground surface indicated at 58. The bowl may be raised or lowered by the jack J. It will be obvious that by swinging the frame F toward the wheel arms WA by contracting the jack J, the bowl will be lowered, for instance, to the scraping and digging position illustrated in Figure 5. This lowering of the bowl, in addition to positioning it so that it can dig the earth and become filled with the earth, accomplishes opening of the apron A in proportion to the depth of cut due to the coaction of the cam surfaces 35 on the side plates 32 of the apron A with the rollers 36 on the wheel arms WA. During the digging operation gusset plates 48a attached to the gate G engage in notches 27b of the bowl sides 27a to limit the forward rotation of the bowl resulting from the scraper blade encountering the earth.

In Figure 4 it will be noted that the roller 36 is below the cam surface 35, while in Figure 5 the cam surface has moved to a position in front of the roller. A maximum depth cut is illustrated in Figure 5 and it will be obvious that a more shallow cut will permit the apron to be closed in proportion to the depth of the cut.

As the machine is pulled forwardly, the earth will be scraped and deflected by the scraper blade SB into the bowl B, thus filling it. In actual practice I find that the bowl can be filled to its maximum capacity in this manner and can even be further operated so that the earth will "boil over" the rear gate G.

As the digging operation proceeds, if the depth of cut results in stalling of the tractor, the operator can back up the tractor slightly and then adjust the jack J so that the scraper blade will be raised slightly for a more shallow cut, whereupon he can proceed without further difficulty. When he backs up the tractor there will be a tendency for the bowl to rock counterclockwise about its pivots 27. This is counteracted by the dump-prevention cams 38 engaging the shafts 16. Thus, by the use of single jack, the depth of cut relative to the surface on which the wheels W are traveling can be adjusted as desired.

After the bowl has been filled, the jack J can be expanded to the position shown in Figure 6 which will lift the scraper blade above the ground surface 58 and will lift the cam surfaces 35 relative to the roller 36 to permit the apron A to close by gravity. As shown by solid lines, the earth in the bowl some times prevents immediate closure of the apron. However, as soon as the earth in the mouth of the bowl drops out to some extent, the apron will drop down to the dotted position, thus completely closing the front end of the bowl.

After the earth in the bowl has been carried to the place where it is desired to deposit it, the jack J may be further extended for the dumping operation as shown in Figure 7. Extension of the jack opens the frame F and the wheel arms WA so that the shafts 16 and the bowl pivots 27 move farther apart. This also moves the link pivots 39 farther from the pivots 42, which results in straightening of the links 43 and 44 until the stop lugs 46 and 47 are engaged. Thereafter the links act as pull connections between the pivots 39 and 42, thus rocking the pivot 39 about the bowl pivot 27. This results in counterclockwise rotation of the bowl and the degree of such rotation increases in proportion to the distance apart of the shafts 16 from the pivots 27. In this manner the single jack J can be used for adjusting the scraper to secure the dumping operation as well as the digging and depth of cut operations and for controlling the position of the apron A during cutting.

The jack J has a further function in adjusting the gate G so that it can act as a variable depth spreader for the earth being dumped. During the dumping operation, the bowl swings away from the gate so that the rear end of the bowl is open and its contents can thereafter be readily discharged as indicated by the dotted line 59 in Figure 7. The parallelogram links 50 serve as supports for the gate G and permit its movement relative to the frame F so that the gate will at first stay in approximately the same elevation as the dumping operation proceeds. This elevation is determined by the rollers 54 rolling along the tracks 55 of the bowl sides 27a. Due to the inclination of the links 50 in the Figures 7 and 8, the rollers 54 are thrust forwardly against the tracks thereby effecting support of the gate as just described.

Finally, as shown in Figure 8, when the jack has been fully extended, the rollers 54 will reach the depressed portions of the tracks 55 which causes a raising of the gate G from the position shown in Figure 7 to the position shown in Figure 8. Between these two positions the gate can therefore be adjusted so that either shallow spreading of the earth as at the dotted line 59 is secured, or any depth between the line 59 and the dotted line 60 in Figure 8 can be secured merely by varying the degree of extension of the jack J.

From the foregoing it is obvious that with one jack I am able to secure all of the desired adjustments of the bowl for digging control of the apron A while digging, positioning of the bowl for the dumping operation, opening of the gate G relative to the bowl during the dumping operation and control of the height of the gate while the load is being dumped and spread by keeping the tractor in motion. By the peculiar coaction of the cam surfaces 35 with the rollers 36, the cams 38 with the shaft 16, the toggle link connections and the rollers 54 coacting with the cams 55, I am able to secure these various adjustments by the mere angular adjustment of the wheel arms WA relative to the frame F.

Certain changes may be made in the construction and arrangement of the parts of my present earth moving device without departing from the real spirit and purpose of my invention. I therefore intend to cover by my claims, such modified forms of structure or use of mechanical equivalents as may be reasonably included within the scope thereof.

I claim as my invention:

1. An earth moving device comprising a frame, wheel arms pivoted thereto, wheels on said wheel arms for supporting said frame, a bowl pivoted to said frame and having sides and a bottom, a front apron spanning the front of said bowl and having side plates extending rearwardly from the side edges of the apron, the rear ends of said side plates being pivoted to said bowl, a rear gate spanning the rear end of said bowl and having links extending forwardly from the side edges of the gate, the forward ends of said links being pivoted to said frame, a scraper blade on the forward end of said bowl, said apron being normally engaged therewith to close said bowl for earth carrying operation and movable therefrom to open said bowl for scraping and loading operation, and means for adjusting said frame relative to said wheel arms during scraping, digging, carrying and dumping operations of said bowl, said wheel arms engaging said side plate and said apron to lift them relative to said frame and thereby raise the apron relative to the bowl during the scraping and loading operations and permitting it to close during the carrying and dumping operations, link connections between said wheel arms and said bowl at points on the bowl spaced from the pivot point thereof to said frame whereby to tip the bowl to dumping position when it is elevated above carrying position, said link connections being ineffective to so tip the bowl during the movement of the bowl through scraping and carrying positions.

2. In an earth moving device of the character disclosed, a frame, wheels for supporting said frame, wheel carrying members for mounting said frame on said wheels, means for relatively adjusting said frame and wheels to secure different elevations of the frame relative to the ground surface, a bowl pivoted to said frame and including sides and a bottom, a scraper blade on the forward edge of said bottom, an apron and a gate for spanning and normally closing the front and rear ends respectively of said bowl, said apron and gate being movable relative to said bowl to open position relative thereto, said wheel carrying members engaging said apron to lift it to open position when said wheels are in a first position relative to said frame for earth scraping operation, and whereby said apron is permitted to close when said wheels are in a second position relative to said frame for earth carrying operation, said gate being carried by said frame and having means engaging said bowl for opening said gate when said wheels are in a third position relative to said frame for earth dumping operation, said wheel carrying members being connected with said bowl to tip it to dumping position when said wheels are in the third position, different dumping positions of said bowl adjusting the height of the lower edge of said gate for earth spreading operation.

3. In an earth moving device, a frame, wheel arms pivoted thereto, wheels on said wheel arms for supporting said frame, a bowl pivoted to said frame and including sides and a bottom, a scraper blade on said bottom, a front apron and a rear gate for normally closing said bowl at its ends, means for relatively adjusting said frame and wheel arms for raising and lowering said bowl relative to the ground surface, said front apron having sides pivoted to the sides of said bowl, said apron sides having cam surfaces coacting with said wheel arms to open the apron when said bowl is lowered by relative movement of said frame and wheel arms toward each other, said cam surfaces, during such coaction, effecting raising of said apron to increase the degree of opening of the apron as the depth of cut of the scraper blade increases.

4. In an earth moving device, a frame, wheel arms pivoted thereto, wheels on said wheel arms for supporting said frame, a bowl pivoted to said frame and including sides and a bottom, a scraper blade on said bottom, a front apron and a rear gate for normally closing said bowl at its ends, means for relatively adjusting said frame and wheel arms for raising and lowering said bowl relative to the ground surface for scraping and carrying purposes, a lost motion connection between said wheel arms and said bowl effecting pivotal movement of said bowl to dumping position when said means is adjusted to a higher than carrying position, said gate being supported by said frame and said bowl being swingable therefrom during the dumping operation.

5. In an earth moving device, a frame, wheel arms pivoted thereto, wheels on said wheel arms for supporting said frame, a bowl pivoted to said frame and including sides and a bottom, a scraper blade on said bottom, a front apron and a rear gate for normally closing said bowl at its ends, means for relatively adjusting said frame and wheel arms for raising and lowering said bowl relative to the ground surface for scraping and carrying purposes, a lost motion connection between said wheel arms and said bowl effecting pivotal movement of said bowl to dumping position when said means is adjusted to higher than carrying position, said gate being supported by said frame and being movable relative thereto and said bowl having a cam coacting with said gate to support it in open position relative to the bowl while the bowl is in dumping position.

6. In an earth moving device, a frame, wheel arms pivoted thereto, wheels on said wheel arms for supporting said frame, a bowl pivoted to said frame and including sides and a bottom, a scraper blade on said bottom, an apron for normally closing said bowl at its front end, means for relatively adjusting said frame and wheel arms for raising and lowering said bowl relative to the ground surface for scraping and carrying purposes, a lost motion connection between said wheel arms and said bowl effecting pivotal movement of said bowl to dumping position only when said means is adjusted to higher than carrying position, said lost motion connection folding and thereby permitting the position of said bowl to remain unaffected during scraping and carrying operations of the bowl.

7. In an earth moving device, a frame, wheels for supporting said frame, a bowl pivoted to said frame and including sides and a bottom, a front apron and a rear gate, means for relatively adjusting said frame and wheels for raising and lowering said bowl relative to the ground surface for scraping and carrying purposes, an operative connection between said wheels and said bowl which remains ineffective while the bowl is in digging and carrying positions and which effects pivotal movement of said bowl to dumping position when said means is adjusted to an excessively high carrying position, said gate being supported by said frame and said bowl being swingable therefrom during the dumping operation.

8. In an earth moving device, a frame, wheels for supporting said frame, a bowl pivoted to said frame and including sides and a bottom, a front apron, a rear gate, means for relatively adjusting said frame and wheels for raising and lowering said bowl relative to the ground surface for scraping and carrying purposes, and an adjustable lost motion connection between said wheels and said bowl which folds to permit movement of the bowl during the scraping and carrying operations and which effects pivotal movement of said bowl to dumping position when said means is adjusted to an excessively high carrying position.

9. In an earth moving device, a frame, wheels for supporting said frame, a bowl pivoted to said frame and including sides and a bottom, a scraper blade on said bottom, a front apron and a rear gate for normally closing said bowl at its ends, means for relatively adjusting said frame and wheels for raising and lowering said bowl relative to the ground surface for scraping and carrying purposes and for moving said bowl to dumping position when said means is adjusted to an excessively high carrying position, said gate being supported by said frame and movable relative thereto, means of coaction between said gate and said bowl to support the gate in open position relative to the bowl while the bowl is in dumping position and to raise it for relatively deeper earth spreading operation in response to movement of the bowl to a greater dumping angle and means to prevent movement of said bowl to dumping position prior to said bowl assuming said excessively high carrying position.

10. In an earth moving device, a frame, wheels for supporting said frame, a bowl pivoted to said frame and including sides and a bottom, a front apron and a rear gate, means for relatively adjusting said frame and wheels for raising and lowering said bowl relative to the ground surface for scraping and carrying purposes and a lost motion connection between said wheels and said bowl effecting pivotal movement of said bowl to dumping position when said means is adjusted to an excessively high carrying position and remaining ineffective while the bowl is in digging and carrying positions.

11. In an earth moving device, a frame, wheels for supporting said frame, a bowl pivoted to said frame and including sides and a bottom, a front apron and a rear gate, means for relatively adjusting said frame and wheels for raising and lowering said bowl relative to the ground surface for scraping and carrying purposes, a lost motion connection between said wheels and said bowl effecting pivotal movement of said bowl to dumping position when said means is adjusted to an excessively high carrying position and remaining ineffective while the bowl is in carrying position, said gate being supported by said frame and movable relative thereto.

12. In an earth moving device, a frame, wheels for suporting said frame, a bowl pivoted to said frame and including sides and a bottom, a front apron and a rear gate, means for relatively adjusting said frame and wheels for raising and lowering said bowl relative to the ground surface for scraping and carrying purposes, a connection between said wheels and said bowl effecting pivotal movement of said bowl to dumping position when said means is adjusted to an excessively high carrying position, said connection being effective only when said means is so adjusted and means of engagement between said bowl and wheels prior to the bowl assuming said excessively high carrying position to prevent the bowl from rotating toward dumping position when the earth moving device is backed up.

13. In an earth moving device, a frame, wheels for supporting said frame, a bowl pivoted to said frame, a front apron for normally closing said bowl, means for relatively adjusting said frame and wheels for raising and lowering said bowl relative to the ground surface, said front apron having sides pivoted to the sides of said bowl, said apron sides and frame having cam mechanism to open the apron when said bowl is lowered by relative movement of said frame and wheels toward each other, said cam mechanism, during such coaction, effecting raising of said apron to increase the degree of opening of the apron as the depth of cut of the bowl increases.

14. An earth moving device of the character disclosed comprising a frame, wheel supports thereon, wheels on said wheel supports for supporting said frame, means to relatively adjust said frame and wheel supports for securing different elevations of the frame relative to the ground surface, a bowl pivoted to said frame and including sides and a bottom, an apron and a gate for normally closing the front and rear ends respectively of said bowl, said apron and gate being movable to open position relative to said bowl, said wheel supports engaging said apron for opening it when said wheels are in a first position relative to said frame for earth scraping operation and disengaging said apron for closing it when said wheels are in second position relative to said frame for earth carrying operation, said wheel supports being operatively connected with said bowl to tip it and said bowl engaging said gate for opening it when said wheels are in a third position relative to said frame for earth dumping operation.

15. In an earth moving device, a frame, wheels for supporting said frame, a bowl pivoted to said frame and including sides and a bottom, a front apron and a rear gate, means for relatively adjusting said frame and wheels for raising and lowering said bowl relative to the ground surface, said front apron having sides pivoted to the sides of said bowl, said sides having cam edges coacting with said frame to swing said apron sides about their pivots when said bowl is lowered by relative movement of said frame and wheels toward each other, said cam surfaces, during such coaction effecting raising of said apron to increase the degree of opening of the apron as the depth of cut of the bowl increases.

16. In an earth moving device of the character disclosed, a frame, wheel supports and wheels for supporting said frame, means for relatively adjusting said frame and wheels to secure different elevations of the frame relative to the ground surface, a bowl pivoted to said frame and including sides and a bottom, an apron for normally closing the front of said bowl, said apron being movable to open position relative to said bowl and means of coaction between said wheel supports and apron for opening said apron when said wheels are in a first position relative to said frame for earth scraping operations and permitting said apron to close when said wheels are in a second position relative to said frame for earth carrying operation.

17. An earth moving device comprising a frame, wheel arms pivoted thereto, wheels on said wheel arms for supporting said frame, a bowl pivoted to said frame and having sides and a bottom, a front apron spanning the front of said bowl and having side plates extending rearwardly from the side edges of the apron, the rear ends of said side plates being pivoted to said bowl, a rear gate spanning the rear end of said bowl and having links extending forwardly from the side edges of the gate, the forward ends of said links being pivoted to said frame, a scraper blade on the forward end of said bowl, said apron being normally engaged therewith to close said bowl for earth carrying operation and movable therefrom to open said bowl for scraping and loading operation, and means for adjusting said frame relative to said wheel arms during scraping, digging, carrying and dumping operations of said bowl, said wheel arms engaging said side plates of said apron to lift them and thereby raise the apron relative to the bowl during the scraping and loading operations of the bowl and permitting the apron to close during the carrying operation of the bowl.

18. An earth moving device comprising a frame, wheel arms pivoted thereto, wheels on said wheel arms for supporting said frame, a bowl pivoted to said frame and having sides and a bottom, a front apron spanning the front of said bowl and having side plates extending rearwardly from the side edges of the apron, the rear ends of said side plates being pivoted to said bowl, a rear gate spanning the rear end of said bowl and having links extending forwardly from the side edges of the gate, the forward ends of said links being pivoted to said frame, a scraper blade on the forward end of said bowl, said apron being normally engaged therewith to close said bowl for earth carrying operation and movable therefrom to open said bowl for scraping and loading operations, and means for adjusting said frame relative to said wheel arms during scraping, digging, carrying and dumping operations of said bowl, said wheel arms engaging said side plates of said apron to open the apron during the scraping and loading operations of the bowl and allowing the apron to close during the dumping operations of the bowl, links connecting said wheel arms and the bowl together to tip the bowl to a dumping position when it is elevated above carrying position, said links having connection with each other which limit their length and permit their collapse when the distance between their connections to the wheel arms and the bowl is less than said length, whereby the bowl is moved to dumping position when above carrying position and remains untipped by collapse of said links when it is below carrying position.

19. An earth moving device comprising a frame, wheels for supporting said frame, a bowl pivoted on said frame and having sides and a bottom, a front apron and a rear gate for spanning the ends of said bowl, said apron and gate being movable relative to said bowl, said apron being normally lowered to close said bowl and movable upward to open said bowl for scraping and loading operations, said apron having sides to overlap the sides of said bowl, said apron sides being pivoted to said bowl sides, flanges supported by and spaced from said bowl sides, said apron having portions located outside said flanges, said flanges and said portions being formed on a curve having a radius from the apron side pivotal connections to said flanges.

20. In an earth moving device of the character disclosed, a frame, wheel supports, wheels mounted thereon for supporting said frame, means for relatively adjusting said frame and wheel supports to secure different elevations of the frame relative to the ground surface, a bowl pivoted to said frame and including sides and a bottom, an apron and a gate for normally closing the front and rear ends respectively of said bowl, said apron and gate being movable to open position relative to said bowl, said wheel supports engaging said apron for opening it when said wheels are in a first position relative to said frame for earth carrying operation and for disengaging said apron for closing it when said wheels are in a second position relative to said frame for earth carrying operation, link connections between said wheel supports and said bowl for tipping the bowl to dumping position, said bowl engaging said gate to move it to open position when said wheels are in the third position relative to said frame for earth dumping operation.

21. In an earth moving device, a frame, wheel arms pivoted thereto, wheels on said wheel arms for supporting said frame, a bowl pivoted to said frame, means for relatively adjusting said frame and wheel arms for lowering and raising said bowl relative to the ground surface for scraping and carrying purposes, a lost motion connection between said wheel arms and said bowl effecting pivotal movement of said bowl to dumping position only when said means is adjusted to higher than carrying position, said lost motion connection folding and thereby permitting the position of said bowl to remain unaffected during the scraping and carrying operations of the bowl.

ELLSWORTH W. AUSTIN.